(12) United States Patent
Kandikonda et al.

(10) Patent No.: US 12,493,430 B2
(45) Date of Patent: Dec. 9, 2025

(54) TECHNIQUES FOR PERFORMING WRITE OPERATIONS

(71) Applicant: Micron Technology, Inc., Boise, ID (US)

(72) Inventors: Ravi Kiran Kandikonda, Frisco, TX (US); Kallol Mazumder, Dallas, TX (US)

(73) Assignee: Micron Technology, Inc., Boise, ID (US)

( * ) Notice: Subject to any disclaimer, the term of this patent is extended or adjusted under 35 U.S.C. 154(b) by 90 days.

(21) Appl. No.: 18/478,893

(22) Filed: Sep. 29, 2023

(65) Prior Publication Data

US 2024/0168678 A1    May 23, 2024

Related U.S. Application Data

(60) Provisional application No. 63/427,358, filed on Nov. 22, 2022.

(51) Int. Cl.
  *G06F 3/06*    (2006.01)
  *G06F 11/263*  (2006.01)

(52) U.S. Cl.
  CPC .......... *G06F 3/0656* (2013.01); *G06F 3/0604* (2013.01); *G06F 3/0659* (2013.01); *G06F 3/0679* (2013.01); *G06F 11/263* (2013.01)

(58) Field of Classification Search
  CPC .... G06F 11/263; G06F 3/0604; G06F 3/0656; G06F 3/0659; G06F 3/0679
  See application file for complete search history.

(56) References Cited

U.S. PATENT DOCUMENTS

2019/0131972 A1\*  5/2019  Gans .................. G11C 7/02

\* cited by examiner

*Primary Examiner* — Yong J Choe
(74) *Attorney, Agent, or Firm* — Holland & Hart LLP

(57) ABSTRACT

Methods, systems, and devices for techniques for performing write operations are described. A controller of a memory system may generate a first command to write first data to a first set of memory cells of a memory array of the memory system. The controller may transmit the first command to a first buffer of the memory system. The first buffer may receive the first command and may generate the first data based on second data from a first address of a register. The first buffer may transmit the first data to the first set of memory cells, via a first buffer, based on the first command.

20 Claims, 7 Drawing Sheets

TECHNIQUES FOR PERFORMING WRITE OPERATIONS

CROSS REFERENCE

The present application for patent claims the benefit of U.S. Provisional Patent Application No. 63/427,358 by Kandikonda et al., entitled "TECHNIQUES FOR PERFORMING WRITE OPERATIONS," filed Nov. 22, 2022, which is assigned to the assignee hereof, and which is expressly incorporated by reference herein.

FIELD OF TECHNOLOGY

The following relates to one or more systems for memory, including techniques for performing write operations.

BACKGROUND

Memory devices are widely used to store information in various electronic devices such as computers, user devices, wireless communication devices, cameras, digital displays, and the like. Information is stored by programming memory cells within a memory device to various states. For example, binary memory cells may be programmed to one of two supported states, often denoted by a logic 1 or a logic 0. In some examples, a single memory cell may support more than two states, any one of which may be stored. To access the stored information, a component may read (e.g., sense, detect, retrieve, identify, determine, evaluate) a stored state in the memory device. To store information, a component may write (e.g., program, set, assign) the state in the memory device.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), self-selecting memory, chalcogenide memory technologies, not- or (NOR) and not- and (NAND) memory devices, and others. Memory cells may be described in terms of volatile configurations or non-volatile configurations. Memory cells configured in a non-volatile configuration may maintain stored logic states for extended periods of time even in the absence of an external power source. Memory cells configured in a volatile configuration may lose stored states when disconnected from an external power source.

DETAILED DESCRIPTION

Figure 1:
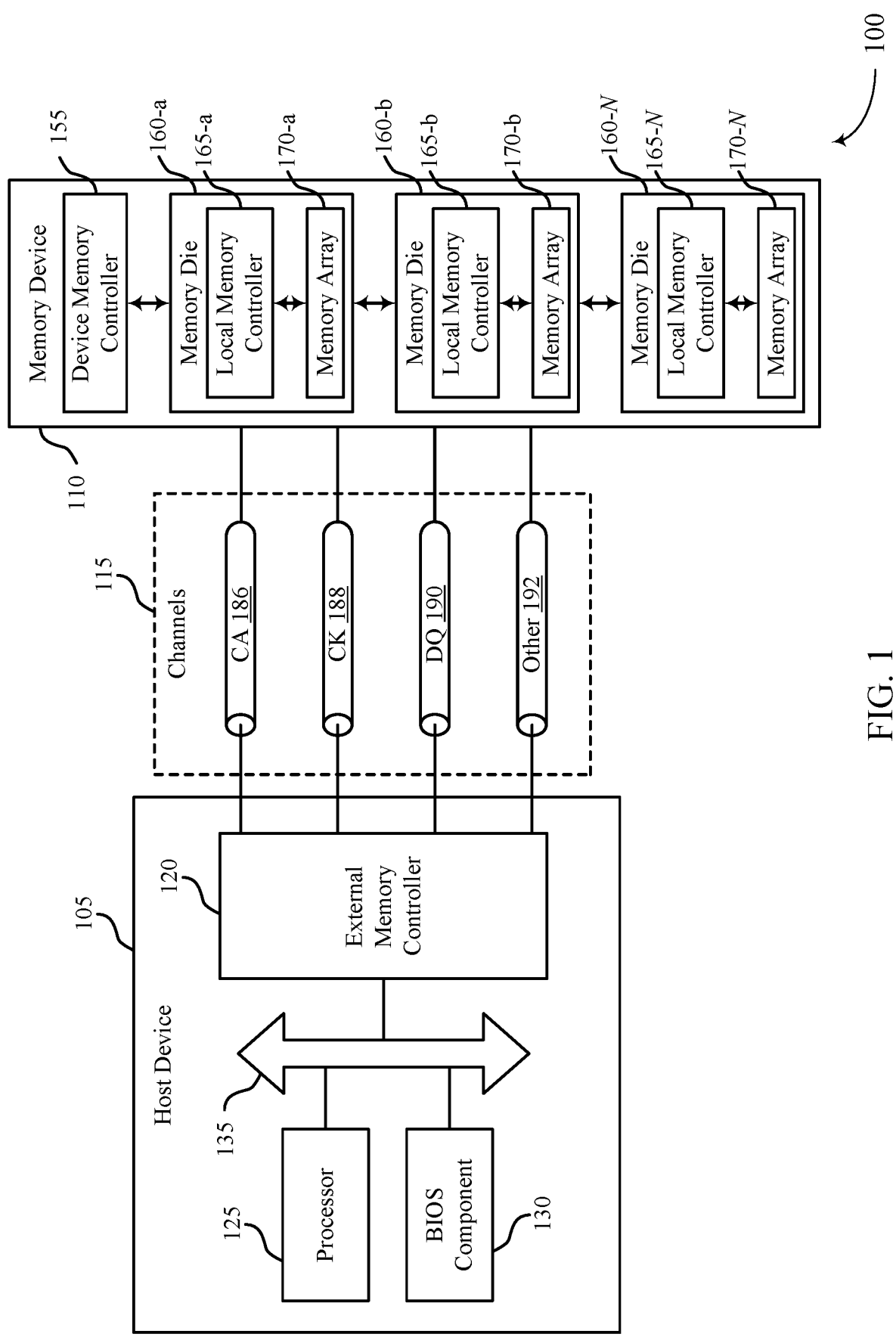
FIG. 1 illustrates an example of a system that supports techniques for performing write operations in accordance with examples as disclosed herein.

Some memory systems may include registers (e.g., mode registers) that store data for write operations. In such memory systems, the registers may be coupled with memory cells via one or more components of the memory system. For example, the memory system may include a set of data input/output (DQ) pins coupled directly with the registers (or coupled with the registers via one or more components). In some cases, the memory system may perform a write operation (e.g., a write pattern (WRP) operation) by transmitting information (e.g., data) from one or more registers to one or more DQ pins. The information may then be routed from the one or more DQ pins to one or more memory cells of the memory system. Additionally, or alternatively, the memory system (e.g., one or more components of the memory system) may generate one or more timing signals for coordinating the routing of the information from the one or more DQ pins to the one or more memory cells. However, the increased signaling overhead and coordination for such write operations (e.g., timing commands, other control signals) may be undesirable. For example, synchronizing timing between multiple DQ pins and multiple data paths may result in increased latency and complexity. Additionally, or alternatively, DQ pins and associated buses or other data paths (e.g., DQ buses), which may primarily be utilized for such write operations, may increase a size (e.g., a footprint) of the memory system. Accordingly, a memory system that reduces signaling overhead and the complexity of signaling for some write commands may be desirable.

In accordance with examples as disclosed herein, a memory system (e.g., a memory device) may perform a WRP operation (e.g., a first type of write operation), which may reduce signaling overhead and reduce timing complexity. Additionally, or alternatively, the WRP operation may not utilize one or more DQ pins or one or more timing components (e.g., DQ strobes) utilized for other different types of write operations, which may decrease a size of a memory system (e.g., a footprint of a memory system).

The memory system (e.g., the memory system configured to perform the WRP operation) may include a buffer (e.g., a WRP buffer), which may receive commands, such as WRP commands, from a memory controller of the memory system. Additionally, or alternatively, the WRP buffer may store information (e.g., data) received from registers of the memory system. For example, mode register data may be continuously available at the WRP buffer, which may allow for data to be written to memory cells without communicating the data via DQ pins. As part of the WRP operation, the WRP buffer may receive a WRP command from the memory controller via a command address (CA) bus and may generate data (e.g., write data based on data from mode registers) based on receiving the command. The WRP buffer may then transmit the generated data to one or more memory cells (e.g., via multiplexing circuitry).

In accordance with examples as disclosed herein, a memory system that includes a WRP buffer may offer one or more advantages when compared to other different memory systems. For example, utilizing a WRP buffer for WRP commands may reduce signaling complexity and thereby reduce power consumption and a likelihood that one or more errors may occur. Additionally, or alternatively, a memory system that performs WRP operations using a WRP buffer may not utilize one or more DQ pins, which may decrease a required size of the memory system, which may be desirable for some applications.

Features of the disclosure are initially described in the context of systems and dies as described with reference to FIGS. 1 and 2. Features of the disclosure are further described in the context of a system and a process flow diagram as described with reference to FIGS. 3 and 4. These and other features of the disclosure are further illustrated by and described with reference to an apparatus diagram and flowcharts that relate to techniques for performing write operations as described with reference to FIGS. 5 through 7.

FIG. 1 illustrates an example of a system 100 that supports techniques for performing write operations in accordance with examples as disclosed herein. The system 100 may include a host device 105, a memory device 110, and a plurality of channels 115 coupling the host device 105 with the memory device 110. The system 100 may include one or more memory devices 110, but aspects of the one or more memory devices 110 may be described in the context of a single memory device (e.g., memory device 110).

The system 100 may include portions of an electronic device, such as a computing device, a mobile computing device, a wireless device, a graphics processing device, a vehicle, or other systems. For example, the system 100 may illustrate aspects of a computer, a laptop computer, a tablet computer, a smartphone, a cellular phone, a wearable device, an internet-connected device, a vehicle controller, or the like. The memory device 110 may be a component of the system 100 that is operable to store data for one or more other components of the system 100.

Portions of the system 100 may be examples of the host device 105. The host device 105 may be an example of a processor (e.g., circuitry, processing circuitry, a processing component) within a device that uses memory to execute processes, such as within a computing device, a mobile computing device, a wireless device, a graphics processing device, a computer, a laptop computer, a tablet computer, a smartphone, a cellular phone, a wearable device, an internet-connected device, a vehicle controller, a system on a chip (SoC), or some other stationary or portable electronic device, among other examples. In some examples, the host device 105 may refer to the hardware, firmware, software, or any combination thereof that implements the functions of an external memory controller 120. In some examples, the external memory controller 120 may be referred to as a host (e.g., host device 105).

A memory device 110 may be an independent device or a component that is operable to provide physical memory addresses/space that may be used or referenced by the system 100. In some examples, a memory device 110 may be configurable to work with one or more different types of host devices. Signaling between the host device 105 and the memory device 110 may be operable to support one or more of: modulation schemes to modulate the signals, various pin configurations for communicating the signals, various form factors for physical packaging of the host device 105 and the memory device 110, clock signaling and synchronization between the host device 105 and the memory device 110, timing conventions, or other functions.

The memory device 110 may be operable to store data for the components of the host device 105. In some examples, the memory device 110 (e.g., operating as a secondary-type device to the host device 105, operating as a dependent-type device to the host device 105) may respond to and execute commands provided by the host device 105 through the external memory controller 120. Such commands may include one or more of a write command for a write operation, a read command for a read operation, a refresh command for a refresh operation, or other commands.

The host device 105 may include one or more of an external memory controller 120, a processor 125, a basic input/output system (BIOS) component 130, or other components such as one or more peripheral components or one or more input/output controllers. The components of the host device 105 may be coupled with one another using a bus 135.

The processor 125 may be operable to provide functionality (e.g., control functionality) for the system 100 or the host device 105. The processor 125 may be a general-purpose processor, a digital signal processor (DSP), an application-specific integrated circuit (ASIC), a field-programmable gate array (FPGA) or other programmable logic device, discrete gate or transistor logic, discrete hardware components, or any combination of these components. In such examples, the processor 125 may be an example of a central processing unit (CPU), a graphics processing unit (GPU), a general purpose GPU (GPGPU), or an SoC, among other examples. In some examples, the external memory controller 120 may be implemented by or be a part of the processor 125.

The BIOS component 130 may be a software component that includes a BIOS operated as firmware, which may initialize and run various hardware components of the system 100 or the host device 105. The BIOS component 130 may also manage data flow between the processor 125 and the various components of the system 100 or the host device 105. The BIOS component 130 may include instructions (e.g., a program, software) stored in one or more of read-only memory (ROM), flash memory, or other non-volatile memory.

In some examples, the system 100 or the host device 105 may include various peripheral components. The peripheral components may be any input device or output device, or an interface for such devices, that may be integrated into or with the system 100 or the host device 105. Examples may include one or more of: a disk controller, a sound controller, a graphics controller, an Ethernet controller, a modem, a universal serial bus (USB) controller, a serial or parallel port, or a peripheral card slot such as peripheral component interconnect (PCI) or specialized graphics ports. The peripheral component(s) may be other components understood by a person having ordinary skill in the art as a peripheral. Additionally, or alternatively, one or more peripheral components may be described with reference to FIG. 3. For example, a system 300 may include a periphery 345, which may include one or more peripheral components.

In some examples, the system 100 or the host device 105 may include an I/O controller. An I/O controller may manage data communication between the processor 125 and the peripheral component(s) (e.g., input devices, output devices). The I/O controller may manage peripherals that are not integrated into or with the system 100 or the host device 105. In some examples, the I/O controller may represent a physical connection (e.g., one or more ports) with external peripheral components.

In some examples, the system 100 or the host device 105 may include an input component, an output component, or both. An input component may represent a device or signal external to the system 100 that provides information (e.g., signals, data) to the system 100 or its components. In some examples, and input component may include an interface (e.g., a user interface or an interface between other devices). In some examples, an input component may be a peripheral that interfaces with system 100 via one or more peripheral components or may be managed by an I/O controller. An output component may represent a device or signal external to the system 100 operable to receive an output from the system 100 or any of its components. Examples of an output component may include a display, audio speakers, a printing device, another processor on a printed circuit board, and others. In some examples, an output may be a peripheral that interfaces with the system 100 via one or more peripheral components or may be managed by an I/O controller.

The memory device 110 may include a device memory controller 155 and one or more memory dies 160 (e.g., memory chips) to support a capacity (e.g., a desired capacity, a specified capacity) for data storage. Each memory die 160 (e.g., memory die 160-a, memory die 160-b, memory die 160-N) may include a local memory controller 165 (e.g., local memory controller 165-a, local memory controller 165-b, local memory controller 165-N) and a memory array 170 (e.g., memory array 170-a, memory array 170-b, memory array 170-N). A memory array 170 may be a collection (e.g., one or more grids, one or more banks, one or more tiles, one or more sections) of memory cells, with each memory cell being operable to store one or more bits of data. A memory device 110 including two or more memory dies 160 may be referred to as a multi-die memory or a multi-die package or a multi-chip memory or a multi-chip package.

The device memory controller 155 may include components (e.g., circuitry, logic) operable to control operation of the memory device 110. The device memory controller 155 may include hardware, firmware, or instructions that enable the memory device 110 to perform various operations and may be operable to receive, transmit, or execute commands, data, or control information related to the components of the memory device 110. The device memory controller 155 may be operable to communicate with one or more of the external memory controller 120, the one or more memory dies 160, or the processor 125. In some examples, the device memory controller 155 may control operation of the memory device 110 described herein in conjunction with the local memory controller 165 of the memory die 160.

A local memory controller 165 (e.g., local to a memory die 160) may include components (e.g., circuitry, logic) operable to control operation of the memory die 160. In some examples, a local memory controller 165 may be operable to communicate (e.g., receive or transmit data or commands or both) with the device memory controller 155. In some examples, a memory device 110 may not include a device memory controller 155, and a local memory controller 165 or the external memory controller 120 may perform various functions described herein. As such, a local memory controller 165 may be operable to communicate with the device memory controller 155, with other local memory controllers 165, or directly with the external memory controller 120, or the processor 125, or any combination thereof. Examples of components that may be included in the device memory controller 155 or the local memory controllers 165 or both may include receivers for receiving signals (e.g., from the external memory controller 120), transmitters for transmitting signals (e.g., to the external memory controller 120), decoders for decoding or demodulating received signals, encoders for encoding or modulating signals to be transmitted, or various other components operable for supporting described operations of the device memory controller 155 or local memory controller 165 or both.

The external memory controller 120 may be operable to enable communication of information (e.g., data, commands, or both) between components of the system 100 (e.g., between components of the host device 105, such as the processor 125, and the memory device 110). The external memory controller 120 may process (e.g., convert, translate) communications exchanged between the components of the host device 105 and the memory device 110. In some examples, the external memory controller 120, or other component of the system 100 or the host device 105, or its functions described herein, may be implemented by the processor 125. For example, the external memory controller 120 may be hardware, firmware, or software, or some combination thereof implemented by the processor 125 or other component of the system 100 or the host device 105. Although the external memory controller 120 is depicted as being external to the memory device 110, in some examples, the external memory controller 120, or its functions described herein, may be implemented by one or more components of a memory device 110 (e.g., a device memory controller 155, a local memory controller 165) or vice versa.

The components of the host device 105 may exchange information with the memory device 110 using one or more channels 115. The channels 115 may be operable to support communications between the external memory controller 120 and the memory device 110. Each channel 115 may be an example of a transmission medium that carries information between the host device 105 and the memory device 110. Each channel 115 may include one or more signal paths (e.g., a transmission medium, a conductor) between terminals associated with the components of the system 100. A signal path may be an example of a conductive path operable to carry a signal. For example, a channel 115 may be associated with a first terminal (e.g., including one or more pins, including one or more pads) at the host device 105 and a second terminal at the memory device 110. A terminal may be an example of a conductive input or output point of a device of the system 100, and a terminal may be operable to act as part of a channel.

Channels 115 (and associated signal paths and terminals) may be dedicated to communicating one or more types of information. For example, the channels 115 may include one or more command and address (CA) channels 186, one or more clock signal (CK) channels 188, one or more data (DQ) channels 190, one or more other channels 192, or any combination thereof. In some examples, signaling may be communicated over the channels 115 using single data rate (SDR) signaling or double data rate (DDR) signaling. In SDR signaling, one modulation symbol (e.g., signal level) of a signal may be registered for each clock cycle (e.g., on a rising or falling edge of a clock signal). In DDR signaling, two modulation symbols (e.g., signal levels) of a signal may be registered for each clock cycle (e.g., on both a rising edge and a falling edge of a clock signal).

In some examples, CA channels 186 may be operable to communicate commands between the host device 105 and the memory device 110 including control information associated with the commands (e.g., address information). For example, commands carried by the CA channel 186 may include a read command with an address of the desired data. In some examples, a CA channel 186 may include any quantity of signal paths (e.g., eight or nine signal paths) to communicate control information (e.g., commands or addresses). As described in further detail with reference to FIGS. 3 and 4, one or more CA channels 186 may be operable to communicate WRP commands.

In some examples, clock signal channels 188 may be operable to communicate one or more clock signals between the host device 105 and the memory device 110. Clock signals may be operable to oscillate between a high state and a low state, and may support coordination (e.g., in time) between actions of the host device 105 and the memory device 110. In some examples, the clock signal may be single ended. In some examples, the clock signal may provide a timing reference for command and addressing operations for the memory device 110, or other system-wide operations for the memory device 110. A clock signal may be referred to as a control clock signal, a command clock signal, or a system clock signal. A system clock signal may be generated by a system clock, which may include one or more hardware components (e.g., oscillators, crystals, logic gates, transistors).

In some examples, data channels 190 may be operable to communicate information (e.g., data, control information) between the host device 105 and the memory device 110. For example, the data channels 190 may communicate information (e.g., bi-directional) to be written to the memory device 110 or information read from the memory device 110.

The channels 115 may include any quantity of signal paths (including a single signal path). In some examples, a channel 115 may include multiple individual signal paths. For example, a channel may be ×4 (e.g., including four signal paths), ×8 (e.g., including eight signal paths), ×16 (including sixteen signal paths), etc.

A memory device 110 may include registers (e.g., mode registers) that store data for write operations. In such memory devices 110, the registers may be coupled with memory cells of one or more memory arrays 170 via one or more components of the memory device 110. For example, the memory device 110 may include a set of data input/output (DQ) pins coupled with the registers. In some cases, the memory system may perform a write operation (e.g., a legacy WRP operation, a second type of write operation) by transmitting information (e.g., data) from one or more registers to one or more DQ pins. The information may then be routed from the one or more DQ pins to one or more memory cells. However, signaling overhead for such write operations (e.g., data transmissions via respective DQ buses, timing commands, and other control signals) may be undesirable. For example, synchronizing timing between multiple DQ pins and multiple data paths may present challenges. Additionally, or alternatively, DQ pins and associated buses, which may primarily be utilized for such write operations, may increase a size (e.g., a footprint) of the memory system. Accordingly, a memory system that includes a WRP buffer for reducing signaling overhead and complexity of signaling for some write commands may be desirable.

In accordance with examples as disclosed herein, a memory system (e.g., a memory device 110) may perform a WRP operation (e.g., a first type of write operation), which may reduce signaling overhead and reduce timing complexity of the memory device 110. Additionally, or alternatively, the WRP operation may not utilize DQ pins and timing components (e.g., DQ strobes) utilized for other types of write operations, which may decrease a size of a memory device 110 (e.g., a footprint of a memory device 110).

The memory device 110 may include a WRP buffer (not shown), which may receive WRP commands from a device memory controller 155. Additionally, or alternatively, the WRP buffer may store information (e.g., data) from various registers of the memory device 110. For example, mode register data may be continuously available at the WRP buffer, which may allow for data to be written to memory cells without communicating the data via DQ pins. As part of the WRP operation, the WRP buffer may receive a WRP command from the device memory controller 155 via a bus (e.g., a CA bus, a bus included in the memory device 110) and may generate data (e.g., write data based on data from mode registers) based on receiving the command. The WRP buffer may then transmit the generated data to one or more memory cells (e.g., via multiplexing circuitry).

Figure 2:
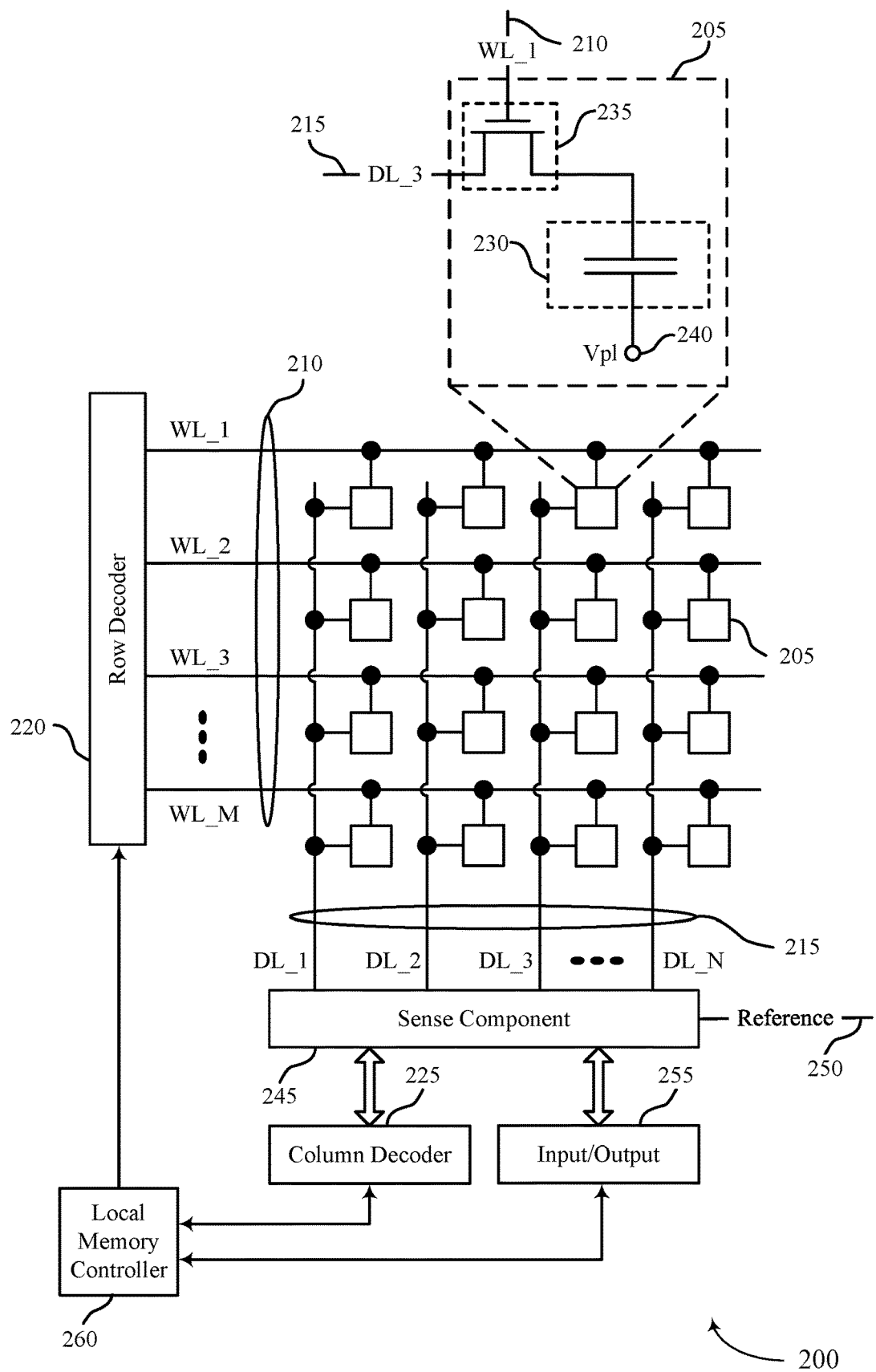
FIG. 2 illustrates an example of a memory die that supports techniques for performing write operations in accordance with examples as disclosed herein.

FIG. 2 illustrates an example of a memory die 200 that supports techniques for performing write operations in accordance with examples as disclosed herein. The memory die 200 may be an example of the memory dies 160 described with reference to FIG. 1. In some examples, the memory die 200 may be referred to as a memory chip, a memory device, or an electronic memory apparatus. The memory die 200 may include one or more memory cells 205 that may be programmable to store different logic states (e.g., programmed to one of a set of two or more possible states). For example, a memory cell 205 may be operable to store one bit of information at a time (e.g., a logic 0 or a logic 1). In some examples, a memory cell 205 (e.g., a multi-level memory cell) may be operable to store more than one bit of information at a time (e.g., a logic 00, logic 01, logic 10, a logic 11). In some examples, the memory cells 205 may be arranged in an array, such as a memory array 170 described with reference to FIG. 1.

In some examples, a memory cell 205 may store a charge representative of the programmable states in a capacitor. DRAM architectures may include a capacitor that includes a dielectric material to store a charge representative of the programmable state. In other memory architectures, other storage devices and components are possible. For example, nonlinear dielectric materials may be employed. The memory cell 205 may include a logic storage component, such as capacitor 230, and a switching component 235 (e.g., a cell selection component). The capacitor 230 may be an example of a dielectric capacitor or a ferroelectric capacitor. A node of the capacitor 230 may be coupled with a voltage source 240, which may be the cell plate reference voltage, such as Vpl, or may be ground, such as Vss.

The memory die 200 may include access lines (e.g., word lines 210, digit lines 215) arranged in a pattern, such as a grid-like pattern. An access line may be a conductive line coupled with a memory cell 205 and may be used to perform access operations on the memory cell 205. In some examples, word lines 210 may be referred to as row lines. In some examples, digit lines 215 may be referred to as column lines or bit lines. References to access lines, row lines, column lines, word lines, digit lines, or bit lines, or their analogues, are interchangeable without loss of understanding. Memory cells 205 may be positioned at intersections of the word lines 210 and the digit lines 215.

Operations such as reading and writing may be performed on the memory cells 205 by activating access lines such as a word line 210 or a digit line 215. By biasing a word line 210 and a digit line 215 (e.g., applying a voltage to the word line 210 or the digit line 215), a single memory cell 205 may be accessed at their intersection. The intersection of a word line 210 and a digit line 215 in a two-dimensional or in a three-dimensional configuration may be referred to as an address of a memory cell 205. Activating a word line 210 or a digit line 215 may include applying a voltage to the respective line.

Accessing the memory cells 205 may be controlled through a row decoder 220, or a column decoder 225, or any combination thereof. For example, a row decoder 220 may receive a row address from the local memory controller 260 and activate a word line 210 based on the received row address. A column decoder 225 may receive a column address from the local memory controller 260 and may activate a digit line 215 based on the received column address.

Selecting or deselecting the memory cell 205 may be accomplished by activating or deactivating the switching component 235 using a word line 210. The capacitor 230 may be coupled with the digit line 215 using the switching component 235. For example, the capacitor 230 may be isolated from digit line 215 when the switching component 235 is deactivated, and the capacitor 230 may be coupled with digit line 215 when the switching component 235 is activated.

The sense component 245 may be operable to detect a state (e.g., a charge) stored on the capacitor 230 of the memory cell 205 and determine a logic state of the memory cell 205 based on the stored state. The sense component 245 may include one or more sense amplifiers to amplify or otherwise convert a signal resulting from accessing the memory cell 205. The sense component 245 may compare a signal detected from the memory cell 205 to a reference 250 (e.g., a reference voltage). The detected logic state of the memory cell 205 may be provided as an output of the sense component 245 (e.g., to an input/output 255), and may indicate the detected logic state to another component of a memory device (e.g., a memory device 110) that includes the memory die 200.

The local memory controller 260 may control the accessing of memory cells 205 through the various components (e.g., row decoder 220, column decoder 225, sense component 245). The local memory controller 260 may be an example of the local memory controller 165 described with reference to FIG. 1. In some examples, one or more of the row decoder 220, column decoder 225, and sense component 245 may be co-located with the local memory controller 260. The local memory controller 260 may be operable to receive one or more of commands or data from one or more different memory controllers (e.g., an external memory controller 120 associated with a host device 105, another controller associated with the memory die 200), translate the commands or the data (or both) into information that can be used by the memory die 200, perform one or more operations on the memory die 200, and communicate data from the memory die 200 to a host (e.g., a host device 105) based on performing the one or more operations. The local memory controller 260 may generate row signals and column address signals to activate the target word line 210 and the target digit line 215. The local memory controller 260 also may generate and control various signals (e.g., voltages, currents) used during the operation of the memory die 200. In general, the amplitude, the shape, or the duration of an applied voltage or current discussed herein may be varied and may be different for the various operations discussed in operating the memory die 200.

The local memory controller 260 may be operable to perform one or more access operations on one or more memory cells 205 of the memory die 200. Examples of access operations may include a write operation, a read operation, a refresh operation, a precharge operation, or an activate operation, among others. In some examples, access operations may be performed by or otherwise coordinated by the local memory controller 260 in response to various access commands (e.g., from a host device 105). The local memory controller 260 may be operable to perform other access operations not listed here or other operations related to the operating of the memory die 200 that are not directly related to accessing the memory cells 205.

The local memory controller 260 may be operable to perform a write operation (e.g., a programming operation) on one or more memory cells 205 of the memory die 200. During a write operation, a memory cell 205 of the memory die 200 may be programmed to store a desired state (e.g., logic state, charge state). The local memory controller 260 may identify a target memory cell 205 on which to perform the write operation. The local memory controller 260 may identify a target word line 210 and a target digit line 215 coupled with the target memory cell 205 (e.g., an address of the target memory cell 205). The local memory controller 260 may activate the target word line 210 and the target digit line 215 (e.g., applying a voltage to the word line 210 or digit line 215) to access the target memory cell 205. The local memory controller 260 may apply a signal (e.g., a write pulse, a write voltage) to the digit line 215 during the write operation to store a specific state (e.g., charge) in the capacitor 230 of the memory cell 205. The signal used as part of the write operation may include one or more voltage levels over a duration.

A memory die 200 may include registers (e.g., mode registers) (not shown) that store data for write operations. In such cases, the registers may be coupled with one or more memory cells 205 of the memory die 200 via one or more components of the memory die 200. For example, the memory die 200 may include a set of data input/output (DQ) pins (not shown) coupled with the registers. In some cases, the memory system may perform a write operation (e.g., a legacy WRP operation, a second type of write operation) by transmitting information (e.g., data) from one or more registers to one or more DQ pins. The information may then be routed from the one or more DQ pins to one or more memory cells 205. However, signaling overhead for such write operations (e.g., data transmissions via respective DQ buses, timing commands, and other control signals) may be undesirable. For example, synchronizing timing between multiple DQ pins and multiple data paths may present challenges. Additionally, or alternatively, DQ pins and associated buses, which may primarily be utilized for such write operations, may increase a size (e.g., a footprint) of a memory die 200. Accordingly, a memory die 200 that includes a WRP buffer for reducing signaling overhead and complexity of signaling for some write commands may be desirable.

In accordance with examples as disclosed herein, data may be written to one or more memory cells 205 of the memory die 200 as part of a WRP operation (e.g., a first type of write operation). The WRP operation may reduce signaling overhead and reduce timing complexity of the memory die 200. Additionally, or alternatively, the WRP operation may not utilize DQ pins and timing components (e.g., DQ strobes) utilized for other types of write operations (e.g., legacy WRP operations), which may decrease a size of a memory system (e.g., a memory die 200).

The memory die 200 may include a WRP buffer (not shown), which may receive WRP commands from a memory controller (e.g., a local memory controller 260). Additionally, or alternatively, the WRP buffer may store information (e.g., data) from various registers of the memory die 200. For example, mode register data may be continuously available at the WRP buffer, which may allow for data to be written to memory cells 205 without communicating the data via DQ pins. As part of the WRP operation, the WRP buffer may receive a WRP command from a memory controller (e.g., a local memory controller 260) via a) bus (e.g., a CA bus, a bus included in or otherwise associated with the memory die 200) and may generate data (e.g., write data based on data from mode registers) based on receiving the command. The WRP buffer may then transmit the generated data to one or more memory cells 205 (e.g., via multiplexing circuitry).

Figure 3:
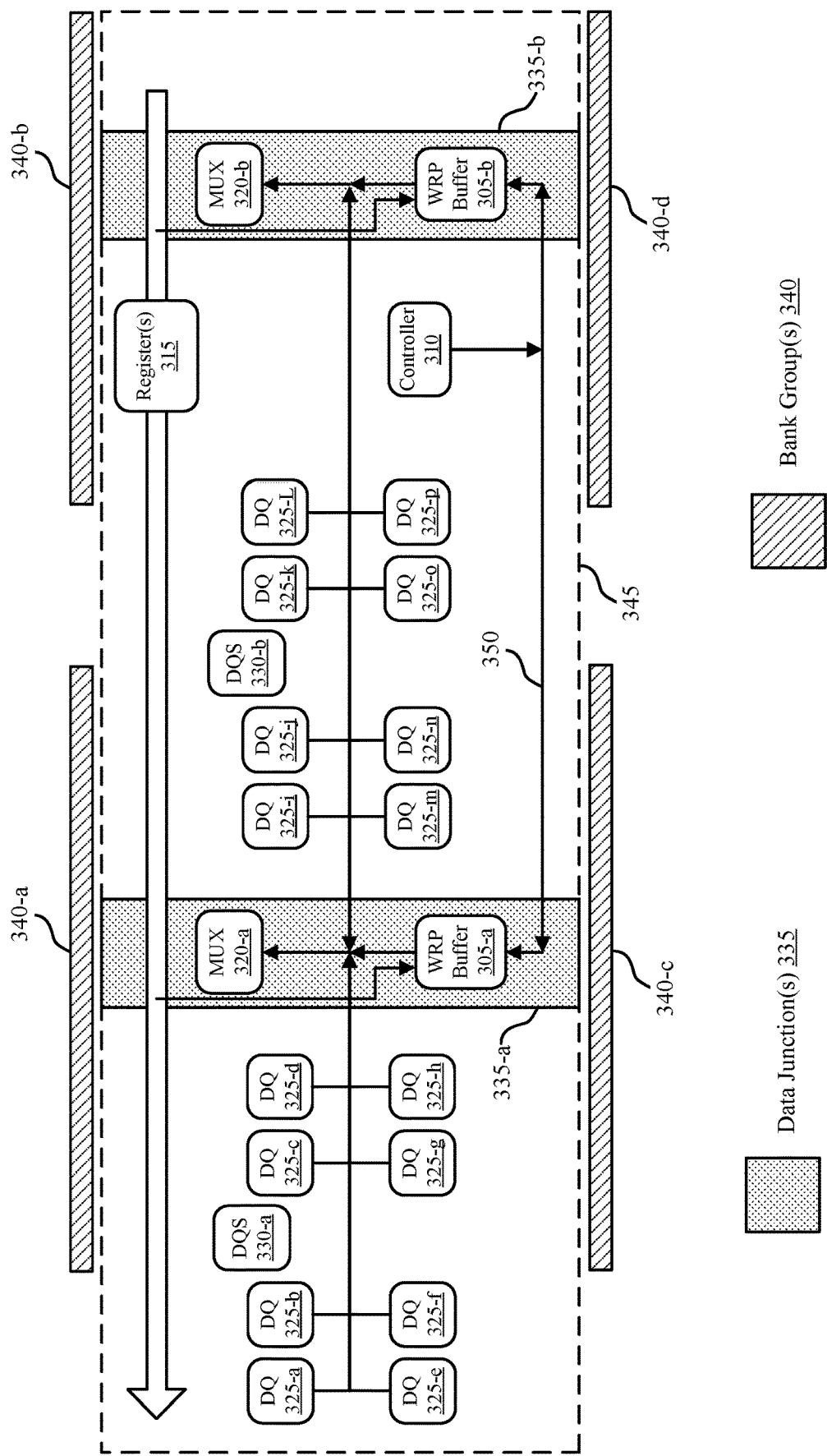
FIG. 3 illustrates an example of a system that supports techniques for performing write operations in accordance with examples as disclosed herein.

FIG. 3 illustrates an example of a system 300 that supports techniques for performing write operations in accordance with examples as disclosed herein. The system 300 may implement one or more aspects of the system 100 or the memory die 200, as described with reference to FIGS. 1 and 2. For example, the system 300 may be an example of a memory device 110, as described with reference to FIG. 1, or any other memory system. The system 300 may include a controller 310, which may be an example of a device memory controller 155 as described with reference to FIG. 1 or a local memory controller 260, as described with reference to FIG. 2. Additionally, or alternatively, the system 300 may include bank groups 340, which may include one or more memory cells 205, as described with reference to FIG. 2. As described herein, the system 300 may perform WRP operations (e.g., write operations different from legacy WRP operations, a first type of write operations), which may reduce signaling overhead and reduce timing complexity. For example, one or more WRP buffers 305 may communicate information to one or more memory cells without being coupled with or otherwise receiving signaling from one or more DQs 325.

The system 300 may include one or more WRP buffers 305 (e.g., WRP buffer 305-a, WRP buffer 305-b), one or more registers 315, one or more multiplexers (MUXs) 320 (e.g., MUX 320-a, MUX 320-b), one or more DQs 325, one or more DQSs 330, one or more data junctions 335, and one or more peripheries 345, which may be implemented by the system 100 or the memory die 200, as described with reference to FIGS. 1 and 2. Additionally, or alternatively, the system 300 may include one or more couplings (e.g., buses, electrical couplings), which may be used for communications between components of the system 300. For example, the WRP buffers 305 may be coupled with the controller 310 via a CA bus 350.

The system 300 may be arranged according to one or more configurations or architectures. For example, the system 300 may include a periphery 345, which may be located between multiple bank groups 340. The periphery 345 may include a portion of a semiconductor material (e.g., a memory die 160, a semiconductor die) that is utilized for circuitry (e.g., peripheral circuitry). The circuitry included in the periphery 345 may be utilized for performing operations and communicating data for memory cells 205, which may be included in one or more bank groups 340. For example, a periphery 345 may include one or more couplings (e.g., a CA bus 350), one or more DQs 325, one or more DQSs 330, one or more registers 315, one or more controllers 310, one or more multiplexers 320, and one or more WRP buffers 305.

Additionally, or alternatively, the periphery 345 may include one or more data junctions 335 or may otherwise be separated or partitioned by the one or more data junctions 335. For example, a data junction 335 may be formed differently than a periphery 345 (e.g., using a different material). A data junction 335 may include any combination of circuitry, components, and couplings for coupling a periphery 345 with one or more bank groups 340. For example, a data junction may include one or more couplings (e.g., one or more buses), one or more multiplexers 320, and one or more WRP buffers 305. Additionally, or alternatively, the periphery may include one or more couplings (e.g., conductive materials) between a WRP buffer 305 and one or more registers 315. In some cases, a multiplexer 320 or a WRP buffer 305 may transmit information to one or more memory cells (e.g., of one or more bank groups 340) via a data junction 335. For example, a data junction 335-a may couple the bank group 340-a, the bank group 340-c, the multiplexer 320-a, and the WRP buffer 305-a. Additionally, or alternatively, a data junction 335-b may couple the bank group 340-b, the bank group 340-d, the multiplexer 320-b, and the WRP buffer 305-a.

The system 300 may include one or more DQs 325 and one or more DQSs 330, which may be grouped in sets. For example, a first portion of the periphery 345 may include a first set of DQs 325 (e.g., a DQ 325-a through a DQ 325-h) and a DQS 330-a. A second portion of the periphery 345 may include a second set of DQs 325 (e.g., a DQ 325-i through a DQ 325-p) and a DQS 330-b. The first portion of the periphery 345 (e.g., including the DQ 325-a through the DQ 325-h) may include or be associated with the bank group 340-a and the bank group 340-c. The second portion of the periphery 345 (e.g., including the DQ 325-i through the DQ 325-p) may include or be associated with the bank group 340-b and the bank group 340-d. In some cases, signaling for each DQ 325 included in the first portion of the periphery 345 may be synchronized according to the DQS 330-a and signaling for each DQ 325 included in the second portion of the periphery 345 may be synchronized according to the DQS 330-b. In some cases, although not shown in FIG. 3, the DQS 330-a and the DQS 330-b may be coupled with one or more DQs 325, one or more multiplexers 320, or both.

The system 300 may include a quantity of bank groups 340 and each bank group 340 may include a quantity of memory cells 205. In some cases, a WRP command may include an indication of which bank group 340 data is written to. As described herein, each bank group 340 (e.g., memory cells 205 of each bank group) may be coupled with one or more components of the periphery 345. For example, the bank group 340-a and the bank group 340-c may be coupled with the multiplexer 320-a. Additionally, or alternatively, the bank group 340-b and the bank group 340-d may be coupled with the multiplexer 320-b. Accordingly, a multiplexer 320 may receive information (e.g., data) and transmit the information to one or more bank groups 340. Additionally, or alternatively, a multiplexer 320 may perform one or more multiplexing operations. For example, a multiplexer 320 may selectively couple a quantity of inputs for multiplexing.

In some cases, a multiplexer 320 may operate according to one or more configurations, which may be selected by one or more control signals. For example, a multiplexer 320 may receive one or more control signals, which may indicate a configuration for the multiplexer 320. The one or more control signals may be received from a WRP buffer 305, a controller 310, or any other component. In some cases, a multiplexer 320 may operate according to a first configuration (e.g., an X4 configuration) where the multiplexer 320 multiplexes four data inputs. In some other cases, a multiplexer 320 may operate according to a second configuration (e.g., an X8 configuration) where the multiplexer 320 multiplexes eight data inputs. In some cases, a test mode may be enabled for various testing purposes such as evaluating a performance of the system 300 or one or more components of the system 300. In some cases, a multiplexer 320 may receive data for the test mode from a WRP buffer 305. For example, a multiplexer 320 may receive data for WRP operations and data for the test mode via one or more same data inputs, which may reduce signaling complexity associated with the test mode.

The system 300 may include a quantity of registers 315 (e.g., mode registers), which may be configured to store information. For example, a register 315 may store a quantity of bits. In some cases, the system 300 may utilize one or more registers 315 to store information in a location different from a memory cell 205. Each register 315 may be coupled with one or more WRP buffers 305. Additionally, or alternatively, a WRP buffer 305 may perform one or more operations to access information (e.g., retrieve information) from one or more registers 315. In some cases, the one or more registers 315 may continuously (e.g., periodically) transmit information to one or more WRP buffers 305.

In some cases, a register 315 may be written using a write command (e.g., a mode register write command). The write command may be received from a host device. In some cases, the write command may include an indication of a register 315 address and one or more operation codes (opcodes). The one or more opcodes may indicate information to be written to the register 315. For example, a register 315 may store multiple bits of data and each bit of data may correspond to (e.g., may be referenced by, may be written by) a respective opcode. In some cases, a first opcode may indicate if a high or low logic state is written to a first bit of data (e.g., of a register 315), a second opcode may indicate if a high or low logic state is written to a second bit of data (e.g., of the register 315), and so forth. Accordingly, each register 315 may store a quantity of bits of data. As an illustrative example, a register 315 may store 8 bits of data, which may be written by 8 opcodes (e.g., OP0 through OP7).

The system 300 may include one or more controllers 310. The controller 310 may be an example of a device memory controller 155 or a local memory controller 165-b (e.g., the controller 310 may be internal or otherwise located within the system 300). In some other cases, the controller may be an example of an external memory controller 120 (e.g., the controller 310 may not be located within the system 300). The controller 310 may perform one or more operations to control the system 300. For example, the controller 310 may generate (e.g., internally) one or more commands, such as write commands, read commands, and WRP commands. The controller 310 may transmit the one or more commands to one or more WRP buffers 305. For example, the controller 310 may be coupled with a WRP buffer 305-a and a WRP buffer 305-a via an electrical coupling, such as a CA bus 350, which may be utilized by the controller 310 for communications with the WRP buffers 305.

The system 300 may include one or more WRP buffers 305. Although the WRP buffer 305-a and the WRP buffer 305-b are described herein as illustrative examples of WRP buffers 305 included in the system 300, the system 300 may include any quantity of WRP buffers 305. Each WRP buffer 305 may be for (e.g., configured for) a quantity of memory cells 205. For example, the WRP buffer 305-a may correspond to and may be coupled with (e.g., via a multiplexer 320-a) a first quantity of memory cells (e.g., memory cells included in a bank group 340-a and a bank group 340-c). Similarly, the WRP buffer 305-b may correspond to and may be coupled with (e.g., via a multiplexer 320-b) a second quantity of memory cells (e.g., memory cells included in a bank group 340-b and a bank group 340-d).

A WRP buffer 305 may initiate writing information to one or more memory cells 205 (e.g., one or more memory cells 205 included in a bank group 340). The WRP buffer 305 may write the information in response to receiving a command from a controller 310, such as a WRP command. The WRP command may indicate a location of information (e.g., a source of the information) for the write command. For example, the WRP command may indicate one or more addresses for one or more registers 315. A WRP buffer 305 may retrieve information from the one or more registers 315 and may transmit the information to one or more memory cells 205. In some cases, the WRP command may indicate one or more memory cells to write the information to, one or more bank groups 340 to write the information to, or both.

In some cases, a WRP buffer 305 may store information from registers 315. For example, information from registers 315 may be continuously available at a WRP buffer 305. In some cases, the WRP buffer 305 may generate information for the WRP operation (e.g., to be written to one or more memory cells). For example, the WRP buffer 305 may receive a WRP command and may generate information based on receiving the WRP command. The WRP buffer 305 may then write the generated information to one or more memory cells 205. The generated information may be based on information from one or more registers 315 (e.g., one or more bits of data written by one or more opcodes). For example, the generated information may include copies of information stored at registers 315.

One or more aspects of a WRP command may be based on one or more timing signals (e.g., a clock signal, a duration, a sample clock signal, a strobe, a signal from a DQS 330). For example, the controller 310 may determine to transmit a WRP command to a WRP buffer 305 based on a timing signal. The controller 310 may receive the timing signal from one or more components of the system 300, the timing signal may be generated by the controller 310, or the controller 310 may receive the timing signal from a timing component that is external to the system 300. In some cases, the timing signal may indicate (e.g., implicitly) whether a data path (e.g., a bus, an electrical coupling) is available for communications. For example, the system 300 (e.g., the controller 310) may be configured to perform respective operations (e.g., transmit respective commands) at intervals that are indicated by the timing signal. Accordingly, a timing of commands transmitted by the controller 310 may be coordinated (e.g., synchronized) with one or more other operations performed by the system 300.

In some cases, a sequence of commands including WRP commands and other commands (e.g., write commands, read commands) may be executed in series. The sequence of commands may be executed based on the timing signal (e.g., a same timing signal). For example, a read command may be executed based on the timing signal and a WRP command may be executed subsequent to the execution of the read command based on the timing signal. In such cases, one or more durations may be configured for WRP commands (e.g., for executing WRP commands, for transmitting WRP commands) and other commands. For example, the controller 310 may periodically transmit WRP commands according to the timing signal. Additionally, or alternatively, a WRP buffer 305 may periodically execute WRP commands according to the timing signal.

A WRP buffer 305 may receive one or more WRP commands from the controller 310 and perform one or more WRP operations based on receiving the one or more WRP commands. A WRP buffer 305 may generate information (e.g., data) and write the information to one or more memory cells of a bank group 340, which may reduce or eliminate data transfer between registers 315 and DQs 325. As described herein, the information generated by a WRP buffer 305 may be from (e.g., based on) information stored in the registers 315. As described herein, a WRP buffer 305 performing a WRP operation or otherwise executing a WRP command may reduce signaling overhead and reduce timing complexity when compared with other types of write operations (e.g., legacy write operations). For example, performing the WRP operation may not utilize DQs 325 or buses associated with the DQs 325 (e.g., DQ buses), which may reduce or eliminate signaling between DQs 325 and other components of the system 300 such as registers 315.

Figure 4:
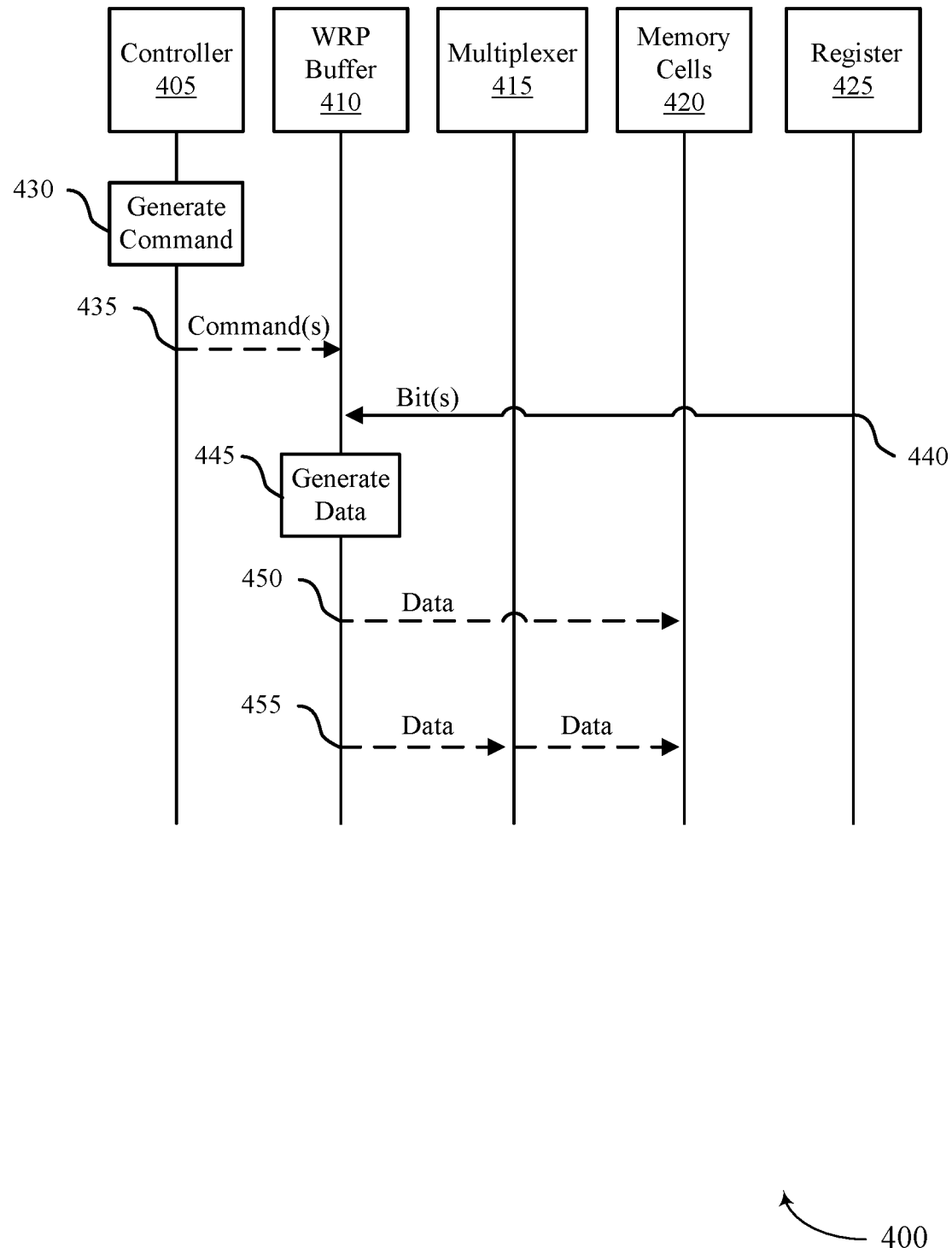
FIG. 4 illustrates an example of a process flow diagram that supports techniques for performing write operations in accordance with examples as disclosed herein.

FIG. 4 illustrates an example of a process flow 400 that supports techniques for performing write operations in accordance with examples as disclosed herein. The process flow 400 may implement one or more aspects of the system 100, the memory die 200, or the system 300. For example, the process flow 400 may include a controller 405, a WRP buffer 410, a multiplexer 415, and a register 425, which may be examples of a controller 310, a WRP buffer 305, a multiplexer 320, and a register 315, as described with reference to FIG. 3. Additionally, or alternatively, the process flow 400 may include memory cells 420, which may be examples of memory cells included in one or more bank groups 340, as described with reference to FIG. 3.

In the following description of the process flow 400, the operations may transmitted in a different order than the order shown, or the operations may be performed at different times. Some operations may also be left out of the process flow 400, or other operations may be added to the process flow 400. While the controller 405, the WRP buffer 410, and the register 425 are shown performing a number of the operations of the process flow 400, any device or component may perform the operations shown. For example, a processor or different type of controller may perform the operations shown.

At 430, the controller 405 (e.g., of a memory system) may generate a first command to write first data to the memory cells 420 (e.g., a first set of memory cells of a memory array of the memory system). In some cases, the first command may include an indication that the first data is for the memory cells 420 (e.g., the first set of memory cells). Additionally, or alternatively, the first command may include an indication of an address of a register 425 (e.g., an address of a mode register). The memory system may include the controller 405, the WRP buffer 410, the multiplexer 415, the memory cells 420, and the register 425.

At 435, the controller 405 may transmit the first command to the WRP buffer 410 (e.g., a first buffer of the memory system) based on generating the first command. Additionally, or alternatively, the controller 405 may transmit the first command to the WRP buffer 410 via a bus (e.g., a CA bus). The bus for transmitting the first command may be different from a bus utilized for other types of commands (e.g., legacy WRP commands). In some cases, the first command may be a first type of command (e.g., a WRP command).

At 440, the WRP buffer 410 (e.g., the first buffer of the memory system) may receive a first set of bits from the register 425 (e.g., a mode register of the memory system) based on generating the first command (e.g., based on the controller 405 generating the first command. Additionally, or alternatively, the WRP buffer 410 may store the first set of bits received from the register 425. In some cases, the first set of bits may be continuously available at the WRP buffer 410.

At 445, the WRP buffer 410 (e.g., the first buffer of the memory system) may generate the first data based on receiving the first set of bits from the register 425. For example, the WRP buffer 410 may generate a copy of the data stored at the register 425. In some other cases, the WRP buffer 410 may receive the first set of bits from the register and transmit the first set of bits to the memory cells 420 (e.g., without generating data or copying data). For example, although the WRP buffer 410 is described as generating the first data, the first data and the first set of bits from the register 425 may be the same or may otherwise convey (e.g., indicate) the same or similar information.

At 450, the WRP buffer 410 (e.g., the first buffer of the memory system) may transmit the first data to the memory cells 420 (e.g., the first set of memory cells of the memory array) based on generating the first data. In some cases, the first command (e.g., generated by the controller 405) may include an indication of an address of the register 425 (e.g., an address of a mode register). In such cases, transmitting the first data to the memory cells 420 (e.g., the first set of memory cells) may be based on the indication of the address of the register 425 (e.g., an address of a mode register).

At 455, the WRP buffer 410 may (e.g., as an alternative to operations performed at 450) transmit the first data to the multiplexer 415. The multiplexer 415 may then transmit the first data to the memory cells 420 (e.g., the first set of memory cells of the memory array). In some cases, the WRP buffer 410 may be coupled with the multiplexer 415. The multiplexer 415 may receive the first data from the WRP buffer 410 via one of multiple inputs. For example, the multiplexer 415 may include one or more inputs for control signaling and one or more inputs for data. The multiplexer 415 may receive one or more control signals via the one or more inputs for control signaling, which may indicate a quantity of inputs (e.g., data inputs) to multiplex (e.g., to combine).

In some cases, one or more additional iterations of the process flow 400 may be performed. In such cases, the one or more additional iterations of the process flow 400 may include performing each step of a first iteration of the process flow 400 or may include performing one or more different steps (e.g., a subset of operations of a first iteration may be performed). For example, the controller 405 may generate a second command to write second data to a second set of memory cells (e.g., memory cells different from the memory cells 420). The controller 405 may transmit the second command to the WRP buffer 410 based on generating the second command. In some cases, the controller 405 may transmit the second command to a buffer different from the WRP buffer 410 (e.g., a second WRP buffer for the second set of memory cells). The WRP buffer 410 may receive a second set of bits from the register 425 based on transmitting the second command. In some other cases, the WRP buffer 410 may receive a second set of bits from a different mode register or a different address of the mode register 425. The WRP buffer 410 may generate the second data based on receiving the second set of bits from the register 425. Additionally, or alternatively, the WRP buffer 410 may transmit the second data to the second set of memory cells of the memory array based on generating the second data.

In some cases, the memory system (e.g., a component of the memory system, a component different from the WRP buffer 410, the controller 405) may receive a third command (e.g., a legacy write command, a second type of command) to write third data to a third set of memory cells of the memory array (e.g., memory cells different from the memory cells 420). In response to receiving the third command, the memory system may write the third data to the third set of memory cells of the memory array based on receiving the third command. In some cases, the first data may be written to the first set of memory cells and the third data may be written to the third set of memory cells according to a clock (e.g., a same clock, a same timing signal, a same strobe) of the memory system.

In some cases, the memory system (e.g., the controller 405) may generate test mode signaling for evaluating one or more performance criteria of the memory system. For example, the test mode signaling may include one or more commands to perform one or more test operations (e.g., for failure analysis, for performance evaluation). Additionally, or alternatively, the test mode signaling may include data signaling, such as communicating test data between components of the memory system. In some cases, the controller 405 may transmit the test mode signaling to the first set of memory cells (e.g., memory cells 420) based on generating the test mode signaling. In some cases, the test mode signaling and the first data may be transmitted to the first set of memory cells (e.g., the memory cells 420) using a same data path.

Figure 5:
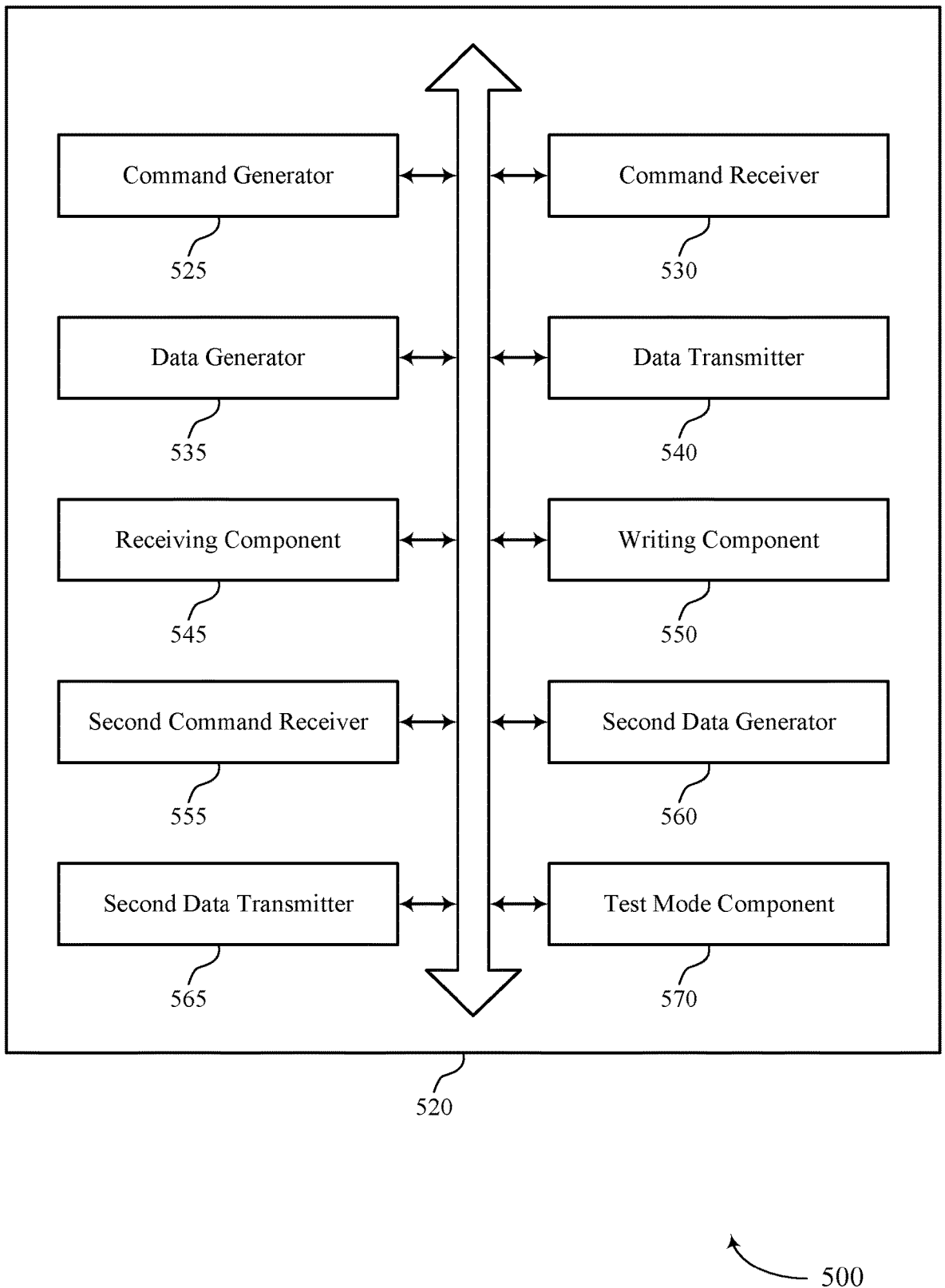
FIG. 5 illustrates a block diagram of a memory device that supports techniques for performing write operations in accordance with examples as disclosed herein.

FIG. 5 illustrates a block diagram 500 of a memory device 520 that supports techniques for performing write operations in accordance with examples as disclosed herein. The memory device 520 may be an example of aspects of a memory device as described with reference to FIGS. 1 through 4. The memory device 520, or various components thereof, may be an example of means for performing various aspects of techniques for performing write operations as described herein. For example, the memory device 520 may include a command generator 525, a command receiver 530, a data generator 535, a data transmitter 540, a receiving component 545, a writing component 550, a second command receiver 555, a second data generator 560, a second data transmitter 565, a test mode component 570, or any combination thereof. Each of these components may communicate, directly or indirectly, with one another (e.g., via one or more buses).

The command generator 525 may be configured as or otherwise support a means for generating, by a memory system, a first command to write first data to a first set of memory cells of a memory array of the memory system. The command receiver 530 may be configured as or otherwise support a means for receiving, by a first buffer of the memory system, a first set of bits from a mode register of the memory system based at least in part on generating the first command. The data generator 535 may be configured as or otherwise support a means for generating, by the first buffer, the first data based at least in part on receiving the first set of bits from the mode register. The data transmitter 540 may be configured as or otherwise support a means for transmitting, by the first buffer, the first data to the first set of memory cells of the memory array based at least in part on generating the first data.

In some examples, the command generator 525 may be configured as or otherwise support a means for transmitting the first command to the first buffer of the memory system based at least in part on generating the first command, where the first buffer receives the first set of bits from the mode register based at least in part on transmitting the first command to the first buffer.

In some examples, the command generator 525 may be configured as or otherwise support a means for generating, by the memory system, a second command to write second data to a second set of memory cells of the memory array of the memory system. In some examples, the command generator 525 may be configured as or otherwise support a means for transmitting the second command to the first buffer of the memory system based at least in part on generating the second command. In some examples, the command receiver 530 may be configured as or otherwise support a means for receiving, by the first buffer, a second set of bits from the mode register based at least in part on transmitting the second command. In some examples, the data generator 535 may be configured as or otherwise support a means for generating, by the first buffer, the second data based at least in part on receiving the second set of bits from the mode register. In some examples, the data transmitter 540 may be configured as or otherwise support a means for transmitting, by the first buffer, the second data to the second set of memory cells of the memory array based at least in part on generating the second data.

In some examples, the receiving component 545 may be configured as or otherwise support a means for receiving, by the memory system, a third command to write third data to a third set of memory cells of the memory array. In some examples, the writing component 550 may be configured as or otherwise support a means for writing, by the memory system, the third data to the third set of memory cells of the memory array based at least in part on receiving the third command, where the first data is written to the first set of memory cells and the third data is written to the third set of memory cells according to a clock of the memory system.

In some examples, the first command includes a first type of write command and the third command includes a second type of write command.

In some examples, the command generator 525 may be configured as or otherwise support a means for generating, by the memory system, a fourth command to write fourth data to a fourth set of memory cells of the memory array. In some examples, the command generator 525 may be configured as or otherwise support a means for transmitting the fourth command to a second buffer of the memory system based at least in part on generating the fourth command. In some examples, the second command receiver 555 may be configured as or otherwise support a means for receiving, by the second buffer, a third set of bits from the mode register based at least in part on transmitting the fourth command. In some examples, the second data generator 560 may be configured as or otherwise support a means for generating, by the second buffer, the fourth data based at least in part on receiving the third set of bits from the mode register. In some examples, the second data transmitter 565 may be configured as or otherwise support a means for transmitting, by the second buffer, the fourth data to the fourth set of memory cells of the memory array based at least in part on generating the fourth data.

In some examples, the first buffer is associated with a first portion of the memory array including the first set of memory cells and the second buffer is associated with a second portion of the memory array including the fourth set of memory cells.

In some examples, the test mode component 570 may be configured as or otherwise support a means for generating, by the memory system, test mode signaling for evaluating one or more performance criteria of the memory system. In some examples, the test mode component 570 may be configured as or otherwise support a means for transmitting the test mode signaling to the first set of memory cells based at least in part on generating the test mode signaling, where the test mode signaling and the first data are transmitted to the first set of memory cells using a same data path.

In some examples, the first command includes an indication that the first data is for the first set of memory cells.

In some examples, the first command includes an indication of an address of the mode register. In some examples, transmitting the first data to the first set of memory cells is based at least in part on the indication.

In some examples, to support transmitting the first data to the first set of memory cells of the memory array, the data transmitter 540 may be configured as or otherwise support a means for transmitting the first data to a multiplexer coupled with the first buffer. In some examples, to support transmitting the first data to the first set of memory cells of the memory array, the data transmitter 540 may be configured as or otherwise support a means for transmitting the first data from the multiplexer to the first set of memory cells of the memory array. In some examples, the first data includes the first set of bits. In some examples, the first command includes a write pattern (WRP) command.

In some examples, the command generator 525 may be configured as or otherwise support a means for initiating generating a first command to write first data to a first set of memory cells of a memory array of a memory system. In some examples, the command receiver 530 may be configured as or otherwise support a means for initiating receiving a first set of bits from a mode register of the memory system based at least in part on generating the first command. In some examples, the data generator 535 may be configured as or otherwise support a means for initiating generating the first data based at least in part on receiving the first set of bits from the mode register. In some examples, the data transmitter 540 may be configured as or otherwise support a means for initiating transmitting the first data to the first set of memory cells of the memory array based at least in part on generating the first data.

Figure 6:
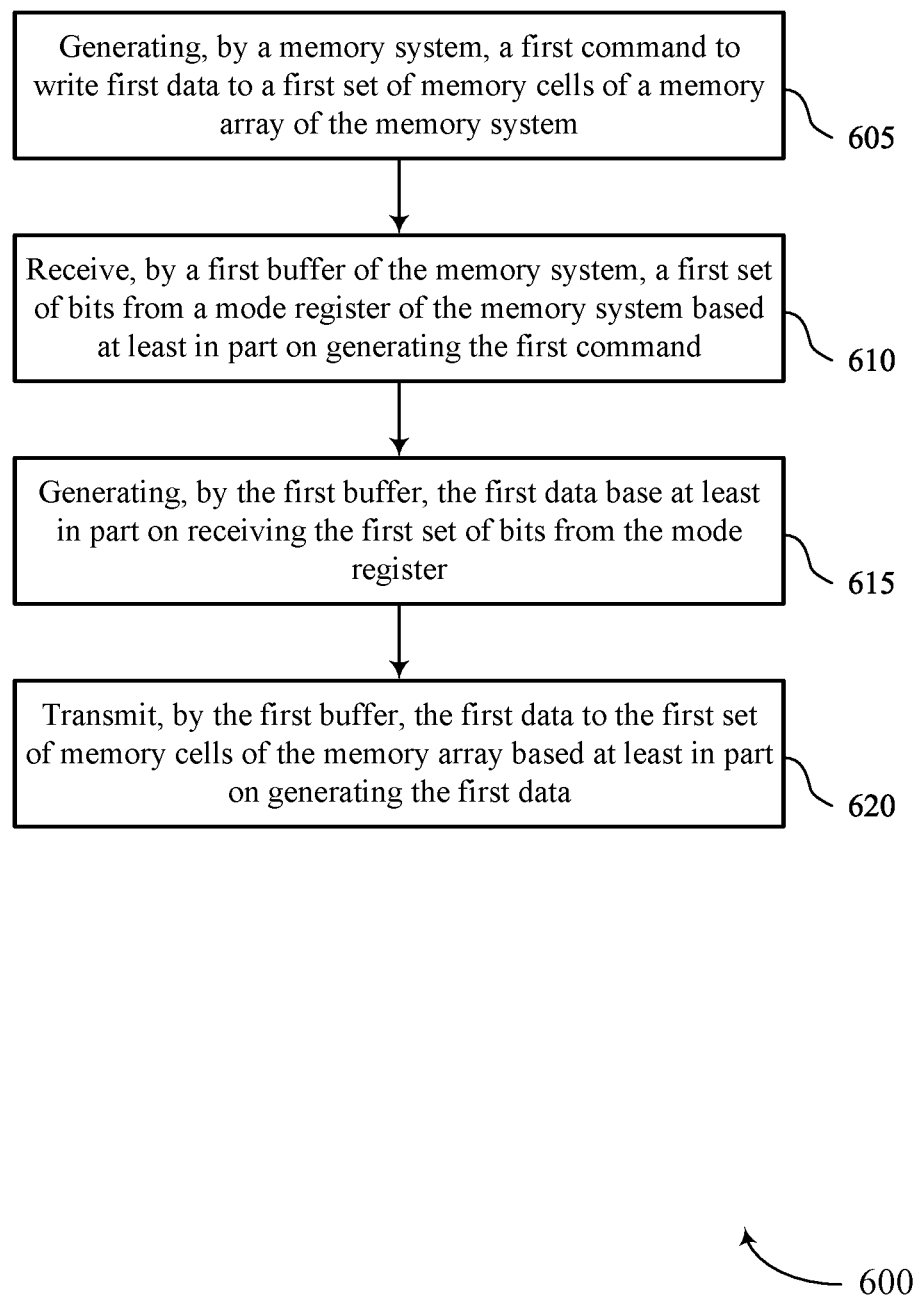
FIGS. 6 and 7 illustrate flowcharts showing a method or methods that support techniques for performing write operations in accordance with examples as disclosed herein.

FIG. 6 illustrates a flowchart showing a method 600 that supports techniques for performing write operations in accordance with examples as disclosed herein. The operations of method 600 may be implemented by a memory device or its components as described herein. For example, the operations of method 600 may be performed by a memory device as described with reference to FIGS. 1 through 5. In some examples, a memory device may execute a set of instructions to control the functional elements of the device to perform the described functions. Additionally, or alternatively, the memory device may perform aspects of the described functions using special-purpose hardware.

At 605, the method may include generating, by a memory system, a first command to write first data to a first set of memory cells of a memory array of the memory system. The operations of 605 may be performed in accordance with examples as disclosed herein. In some examples, aspects of the operations of 605 may be performed by a command generator 525 as described with reference to FIG. 5.

At 610, the method may include receiving, by a first buffer of the memory system, a first set of bits from a mode register of the memory system based at least in part on generating the first command. The operations of 610 may be performed in accordance with examples as disclosed herein. In some examples, aspects of the operations of 610 may be performed by a command receiver 530 as described with reference to FIG. 5.

At 615, the method may include generating, by the first buffer, the first data based at least in part on receiving the first set of bits from the mode register. The operations of 615 may be performed in accordance with examples as disclosed herein. In some examples, aspects of the operations of 615 may be performed by a data generator 535 as described with reference to FIG. 5.

At 620, the method may include transmitting, by the first buffer, the first data to the first set of memory cells of the memory array based at least in part on generating the first data. The operations of 620 may be performed in accordance with examples as disclosed herein. In some examples, aspects of the operations of 620 may be performed by a data transmitter 540 as described with reference to FIG. 5.

In some examples, an apparatus as described herein may perform a method or methods, such as the method 600. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for generating, by a memory system, a first command to write first data to a first set of memory cells of a memory array of the memory system; receiving, by a first buffer of the memory system, a first set of bits from a mode register of the memory system based at least in part on generating the first command; generating, by the first buffer, the first data based at least in part on receiving the first set of bits from the mode register; and transmitting, by the first buffer, the first data to the first set of memory cells of the memory array based at least in part on generating the first data.

Aspect 2: The method, apparatus, or non-transitory computer-readable medium of aspect 1, further including operations, features, circuitry, logic, means, or instructions, or any combination thereof for transmitting the first command to the first buffer of the memory system based at least in part on generating the first command, where the first buffer receives the first set of bits from the mode register based at least in part on transmitting the first command to the first buffer.

Aspect 3: The method, apparatus, or non-transitory computer-readable medium of any of aspects 1 through 2, further including operations, features, circuitry, logic, means, or instructions, or any combination thereof for generating, by the memory system, a second command to write second data to a second set of memory cells of the memory array of the memory system; transmitting the second command to the first buffer of the memory system based at least in part on generating the second command; receiving, by the first buffer, a second set of bits from the mode register based at least in part on transmitting the second command; generating, by the first buffer, the second data based at least in part on receiving the second set of bits from the mode register; and transmitting, by the first buffer, the second data to the second set of memory cells of the memory array based at least in part on generating the second data.

Aspect 4: The method, apparatus, or non-transitory computer-readable medium of any of aspects 1 through 3, further including operations, features, circuitry, logic, means, or instructions, or any combination thereof for receiving, by the memory system, a third command to write third data to a third set of memory cells of the memory array and writing, by the memory system, the third data to the third set of memory cells of the memory array based at least in part on receiving the third command, where the first data is written to the first set of memory cells and the third data is written to the third set of memory cells according to a clock of the memory system.

Aspect 5: The method, apparatus, or non-transitory computer-readable medium of aspect 4, where the first command includes a first type of write command and the third command includes a second type of write command.

Aspect 6: The method, apparatus, or non-transitory computer-readable medium of any of aspects 1 through 5, further including operations, features, circuitry, logic, means, or instructions, or any combination thereof for generating, by the memory system, a fourth command to write fourth data to a fourth set of memory cells of the memory array; transmitting the fourth command to a second buffer of the memory system based at least in part on generating the fourth command; receiving, by the second buffer, a third set of bits from the mode register based at least in part on transmitting the fourth command; generating, by the second buffer, the fourth data based at least in part on receiving the third set of bits from the mode register; and transmitting, by the second buffer, the fourth data to the fourth set of memory cells of the memory array based at least in part on generating the fourth data.

Aspect 7: The method, apparatus, or non-transitory computer-readable medium of aspect 6, where the first buffer is associated with a first portion of the memory array including the first set of memory cells and the second buffer is associated with a second portion of the memory array including the fourth set of memory cells.

Aspect 8: The method, apparatus, or non-transitory computer-readable medium of any of aspects 1 through 7, further including operations, features, circuitry, logic, means, or instructions, or any combination thereof for generating, by the memory system, test mode signaling for evaluating one or more performance criteria of the memory system and transmitting the test mode signaling to the first set of memory cells based at least in part on generating the test mode signaling, where the test mode signaling and the first data are transmitted to the first set of memory cells using a same data path.

Aspect 9: The method, apparatus, or non-transitory computer-readable medium of any of aspects 1 through 8, where the first command includes an indication that the first data is for the first set of memory cells.

Aspect 10: The method, apparatus, or non-transitory computer-readable medium of any of aspects 1 through 9, where the first command includes an indication of an address of the mode register and transmitting the first data to the first set of memory cells is based at least in part on the indication.

Aspect 11: The method, apparatus, or non-transitory computer-readable medium of any of aspects 1 through 10, where transmitting the first data to the first set of memory cells of the memory array further includes operations, features, circuitry, logic, means, or instructions, or any combination thereof for transmitting the first data to a multiplexer coupled with the first buffer and transmitting the first data from the multiplexer to the first set of memory cells of the memory array.

Aspect 12: The method, apparatus, or non-transitory computer-readable medium of any of aspects 1 through 11, where the first data includes the first set of bits.

Aspect 13: The method, apparatus, or non-transitory computer-readable medium of any of aspects 1 through 12, where the first command includes a write pattern (WRP) command.

Figure 7:
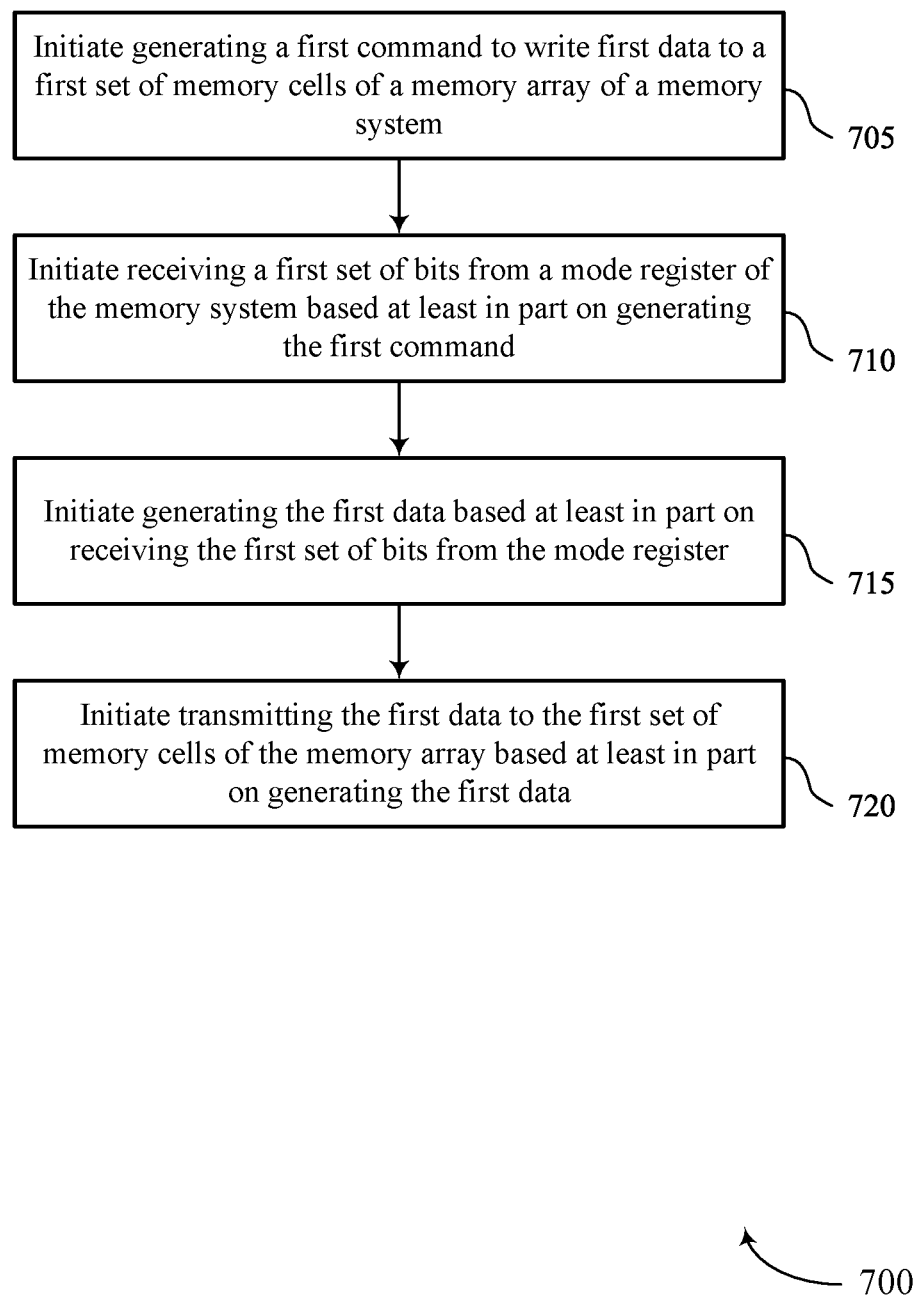

FIG. 7 illustrates a flowchart showing a method 700 that supports techniques for performing write operations in accordance with examples as disclosed herein. The operations of method 700 may be implemented by a memory device or its components as described herein. For example, the operations of method 700 may be performed by a memory device as described with reference to FIGS. 1 through 5. In some examples, a memory device may execute a set of instructions to control the functional elements of the device to perform the described functions. Additionally, or alternatively, the memory device may perform aspects of the described functions using special-purpose hardware.

At 705, the method may include initiating generating a first command to write first data to a first set of memory cells of a memory array of a memory system. The operations of 705 may be performed in accordance with examples as disclosed herein. In some examples, aspects of the operations of 705 may be performed by a command generator 525 as described with reference to FIG. 5.

At 710, the method may include initiating receiving a first set of bits from a mode register of the memory system based at least in part on generating the first command. The operations of 710 may be performed in accordance with examples as disclosed herein. In some examples, aspects of the operations of 710 may be performed by a command receiver 530 as described with reference to FIG. 5.

At 715, the method may include initiating generating the first data based at least in part on receiving the first set of bits from the mode register. The operations of 715 may be performed in accordance with examples as disclosed herein. In some examples, aspects of the operations of 715 may be performed by a data generator 535 as described with reference to FIG. 5.

At 720, the method may include initiating transmitting the first data to the first set of memory cells of the memory array based at least in part on generating the first data. The operations of 720 may be performed in accordance with examples as disclosed herein. In some examples, aspects of the operations of 720 may be performed by a data transmitter 540 as described with reference to FIG. 5.

In some examples, an apparatus as described herein may perform a method or methods, such as the method 700. The apparatus may include features, circuitry, logic, means, or instructions (e.g., a non-transitory computer-readable medium storing instructions executable by a processor), or any combination thereof for performing the following aspects of the present disclosure:

Aspect 14: A method, apparatus, or non-transitory computer-readable medium including operations, features, circuitry, logic, means, or instructions, or any combination thereof for initiating generating a first command to write first data to a first set of memory cells of a memory array of a memory system; initiating receiving a first set of bits from a mode register of the memory system based at least in part on generating the first command; initiating generating the first data based at least in part on receiving the first set of bits from the mode register; and initiating transmitting the first data to the first set of memory cells of the memory array based at least in part on generating the first data.

It should be noted that the methods described herein describe possible implementations, and that the operations and the steps may be rearranged or otherwise modified and that other implementations are possible. Further, portions from two or more of the methods may be combined.

An apparatus is described. The following provides an overview of aspects of the apparatus as described herein:

Aspect 15: An apparatus, including: a mode register; a memory array including at least a first set of memory cells; a controller configured to generate a first command to write first data to the first set of memory cells of the memory array; a first buffer coupled with the controller and a mode register, the first buffer configured to generate the first data based at least in part on receiving a first set of bits from the mode register; and a first multiplexer coupled with the first buffer and the memory array, the first multiplexer configured to receive the first data from the first buffer and to transmit the first data to the first set of memory cells.

Aspect 16: The apparatus of aspect 15, further including: a command address bus coupled with the controller and the first buffer, where the first buffer is configured to receive the first command via the command address bus.

Aspect 17: The apparatus of any of aspects 15 through 16, further including: a first data bus coupled with the memory array and the first multiplexer, where the first multiplexer is configured to transmit the first data to the first set of memory cells via the first data bus; and a second data bus coupled with the first multiplexer and the first buffer, where the first buffer is configured to transmit the first data to the first multiplexer via the second data bus.

Aspect 18: The apparatus of any of aspects 15 through 17, further including: a third data bus; and a plurality of data pins coupled with the third data bus, where at least a subset of the plurality of data pins are inactive while the first data is transmitted to the first set of memory cells.

Aspect 19: The apparatus of any of aspects 15 through 18, further including: a second buffer coupled with the controller and the mode register, where the second buffer is configured to generate second data based at least in part on receiving a second set of bits from the mode register; and a second multiplexer coupled with the second buffer and the memory array, where the second multiplexer is configured to receive the second data from the second buffer and transmit the second data to a second set of memory cells of the memory array.

Aspect 20: The apparatus of any of aspects 15 through 19, where the first command includes a write pattern (WRP) command.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (e.g., in conductive contact with, connected with, coupled with) one another if there is any electrical path (e.g., conductive path) between the components that can, at any time, support the flow of signals (e.g., charge, current, voltage) between the components. At any given time, a conductive path between components that are in electronic communication with each other (e.g., in conductive contact with, connected with, coupled with) may be an open circuit or a closed circuit based on the operation of the device that includes the connected components. A conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to condition of moving from an open-circuit relationship between components in which signals are not presently capable of being communicated between the components (e.g., over a conductive path) to a closed-circuit relationship between components in which signals are capable of being communicated between components (e.g., over the conductive path). When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component (e.g., a transistor) discussed herein may represent a field-effect transistor (FET), and may comprise a three-terminal component including a source (e.g., a source terminal), a drain (e.g., a drain terminal), and a gate (e.g., a gate terminal). The terminals may be connected to other electronic components through conductive materials (e.g., metals, alloys). The source and drain may be conductive, and may comprise a doped (e.g., heavily-doped, degenerate) semiconductor region. The source and drain may be separated by a doped (e.g., lightly-doped) semiconductor region or channel. If the channel is n-type (e.g., majority carriers are electrons), then the FET may be referred to as a n-type FET. If the channel is p-type (e.g., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over as one or more instructions (e.g., code) on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and modules described in connection with the disclosure herein may be implemented or performed with a processor, such as a DSP, an ASIC, an FPGA, discrete gate logic, discrete transistor logic, discrete hardware components, other programmable logic device, or any combination thereof designed to perform the functions described herein. A processor may be an example of a microprocessor, a controller, a microcontroller, a state machine, or any type of processor. A processor may also be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a computer, or a processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method, comprising:
generating, by a memory system, a first command to write first data to a first set of memory cells of a memory array of the memory system;
transmitting the first command to a first buffer of the memory system based at least in part on generating the first command;
receiving, by the first buffer of the memory system, a first set of bits from a mode register of the memory system based at least in part on generating the first command, wherein the first buffer receives the first set of bits from the mode register based at least in part on transmitting the first command to the first buffer;
generating, by the first buffer, the first data based at least in part on receiving the first set of bits from the mode register; and
transmitting, by the first buffer, the first data to the first set of memory cells of the memory array based at least in part on generating the first data.

2. The method of claim 1, further comprising:
generating, by the memory system, a second command to write second data to a second set of memory cells of the memory array of the memory system;
transmitting the second command to the first buffer of the memory system based at least in part on generating the second command;
receiving, by the first buffer, a second set of bits from the mode register based at least in part on transmitting the second command;
generating, by the first buffer, the second data based at least in part on receiving the second set of bits from the mode register; and
transmitting, by the first buffer, the second data to the second set of memory cells of the memory array based at least in part on generating the second data.

3. The method of claim 1, further comprising:
receiving, by the memory system, a third command to write third data to a third set of memory cells of the memory array; and writing, by the memory system, the third data to the third set of memory cells of the memory array based at least in part on receiving the third command, wherein the first data is written to the first set of memory cells and the third data is written to the third set of memory cells according to a clock of the memory system.

4. The method of claim 3, wherein the first command comprises a first type of write command and the third command comprises a second type of write command.

5. The method of claim 1, further comprising:
generating, by the memory system, a fourth command to write fourth data to a fourth set of memory cells of the memory array;
transmitting the fourth command to a second buffer of the memory system based at least in part on generating the fourth command;
receiving, by the second buffer, a third set of bits from the mode register based at least in part on transmitting the fourth command;
generating, by the second buffer, the fourth data based at least in part on receiving the third set of bits from the mode register; and
transmitting, by the second buffer, the fourth data to the fourth set of memory cells of the memory array based at least in part on generating the fourth data.

6. The method of claim 5, wherein the first buffer is associated with a first portion of the memory array comprising the first set of memory cells and the second buffer is associated with a second portion of the memory array comprising the fourth set of memory cells.

7. The method of claim 1, further comprising:
generating, by the memory system, test mode signaling for evaluating one or more performance criteria of the memory system; and
transmitting the test mode signaling to the first set of memory cells based at least in part on generating the test mode signaling, wherein the test mode signaling and the first data are transmitted to the first set of memory cells using a same data path.

8. The method of claim 1, wherein the first command includes an indication that the first data is for the first set of memory cells.

9. The method of claim 1, wherein:
the first command comprises an indication of an address of the mode register; and
transmitting the first data to the first set of memory cells is based at least in part on the indication.

10. The method of claim 1, wherein transmitting the first data to the first set of memory cells of the memory array further comprises:
transmitting the first data to a multiplexer coupled with the first buffer; and
transmitting the first data from the multiplexer to the first set of memory cells of the memory array.

11. The method of claim 1, wherein the first data comprises the first set of bits.

12. The method of claim 1, wherein the first command comprises a write pattern (WRP) command.

13. An apparatus, comprising:
a mode register;
a memory array comprising at least a first set of memory cells;
a controller configured to generate a first command to write first data to the first set of memory cells of the memory array;
a first buffer coupled with the controller and the mode register, the controller configured to transmit the first command to the first buffer based at least in part on generation of the first command, the first buffer configured to generate the first data based at least in part on receiving a first set of bits from the mode register, the first buffer configured to receive the first set of bits from the mode register based at least in part on transmission of the first command to the first buffer; and
a first multiplexer coupled with the first buffer and the memory array, the first multiplexer configured to receive the first data from the first buffer and to transmit the first data to the first set of memory cells.

14. The apparatus of claim 13, further comprising:
a command address bus coupled with the controller and the first buffer, wherein the first buffer is configured to receive the first command via the command address bus.

15. The apparatus of claim 13, further comprising:
a first data bus coupled with the memory array and the first multiplexer, wherein the first multiplexer is configured to transmit the first data to the first set of memory cells via the first data bus; and
a second data bus coupled with the first multiplexer and the first buffer, wherein the first buffer is configured to transmit the first data to the first multiplexer via the second data bus.

16. The apparatus of claim 13, further comprising:
a third data bus; and
a plurality of data pins coupled with the third data bus, wherein at least a subset of the plurality of data pins are inactive while the first data is transmitted to the first set of memory cells.

17. The apparatus of claim 13, further comprising:
a second buffer coupled with the controller and the mode register, wherein the second buffer is configured to generate second data based at least in part on receiving a second set of bits from the mode register; and
a second multiplexer coupled with the second buffer and the memory array, wherein the second multiplexer is configured to receive the second data from the second buffer and transmit the second data to a second set of memory cells of the memory array.

18. The apparatus of claim 13, wherein the first command comprises a write pattern (WRP) command.

19. The apparatus of claim 13, wherein the first command includes an indication that the first data is for the first set of memory cells.

20. A non-transitory computer-readable medium storing code, the code comprising instructions executable by a processor to:
initiate generating a first command to write first data to a first set of memory cells of a memory array of a memory system;
initiate transmitting the first command to a first buffer of the memory system based at least in part on generating the first command;
initiate receiving by the first buffer of a first set of bits from a mode register of the memory system based at least in part on generating the first command, wherein the initiating receiving the first set of bits is based at least in part on transmission of the first command to the first buffer;
initiate generating the first data based at least in part on receiving the first set of bits from the mode register; and
initiate transmitting the first data to the first set of memory cells of the memory array based at least in part on generating the first data.

* * * * *